(12) United States Patent
Xiong et al.

(10) Patent No.: US 10,747,215 B2
(45) Date of Patent: Aug. 18, 2020

(54) METHOD AND TERMINAL DEVICE FOR DIAGNOSING ROBOT ERRORS

(71) Applicant: UBTECH Robotics Corp, Shenzhen (CN)

(72) Inventors: Youjun Xiong, Shenzhen (CN); Wenxue Xie, Shenzhen (CN); Gaobo Huang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 335 days.

(21) Appl. No.: 15/856,062

(22) Filed: Dec. 28, 2017

(65) Prior Publication Data

US 2019/0094846 A1 Mar. 28, 2019

(30) Foreign Application Priority Data

Sep. 28, 2017 (CN) .......................... 2017 1 0899906

(51) Int. Cl.
*G05B 23/02* (2006.01)
*B25J 9/16* (2006.01)

(52) U.S. Cl.
CPC ........ *G05B 23/0264* (2013.01); *B25J 9/1674* (2013.01); *Y10S 901/50* (2013.01)

(58) Field of Classification Search
CPC ... B25J 9/1674; B25J 9/1647; G05B 23/0264; G05B 23/0267
See application file for complete search history.

(56) References Cited

U.S. PATENT DOCUMENTS

2014/0201571 A1\* 7/2014 Hosek ................. G06F 11/2257
714/26
2018/0286212 A1\* 10/2018 Suzuki ............... G05B 23/0267

FOREIGN PATENT DOCUMENTS

CN 104635718 A 5/2015
CN 106842152 A 6/2017

\* cited by examiner

*Primary Examiner* — Bryan Bui

(57) ABSTRACT

An error diagnosis method of a robot includes determining operational status of components of a robot and determining an operational status of a main control process of the robot, generating diagnosis data comprising a data format having an error status level, a name of an error diagnosis processes of the components, and an error code identity (ID) number, packaging diagnosis data of the operational status of the components as diagnosis information in a predetermined data format, storing the diagnosis information in memory.

6 Claims, 5 Drawing Sheets

METHOD AND TERMINAL DEVICE FOR DIAGNOSING ROBOT ERRORS

CROSS REFERENCE TO RELATED APPLICATIONS

This application claims priority to Chinese Patent Application No. 201710899906.5, filed Sep. 28, 2017, which is hereby incorporated by reference herein in its entirety.

BACKGROUND

1. Technical Field

The present disclosure relates to robots, and more particularly to a method, a system, and a terminal device for diagnosing robot errors.

2. Description of Related Art

With the evolution of technology, a variety of intelligent robots, such as service-type robots, underwater robots, entertainment robots, military robots, agricultural robots, and robotic machines, have brought great convenience to mass production of goods and daily life of humans.

However, when conventional robots are not operating properly, only professional maintenance staff may perform disassembly and perform error detection processes. Errors may not be quickly identified, and the cause of the errors may be difficult to determine. Moreover, the maintenance staff usually is only able to detect hardware errors, and software errors may only be detected by software programmers. As such, error detection of the robots increases.

DETAILED DESCRIPTION

To clarify the purpose, technical solutions, and the advantages of the disclosure, embodiments of the invention will now be described more fully hereinafter with reference to the accompanying drawings, in which embodiments of the invention are shown.

As used herein, the term "main control process" refers to a computer-implemented process/method for a physical component. The main control process may be a sub-process, in one example.

Figure 1:
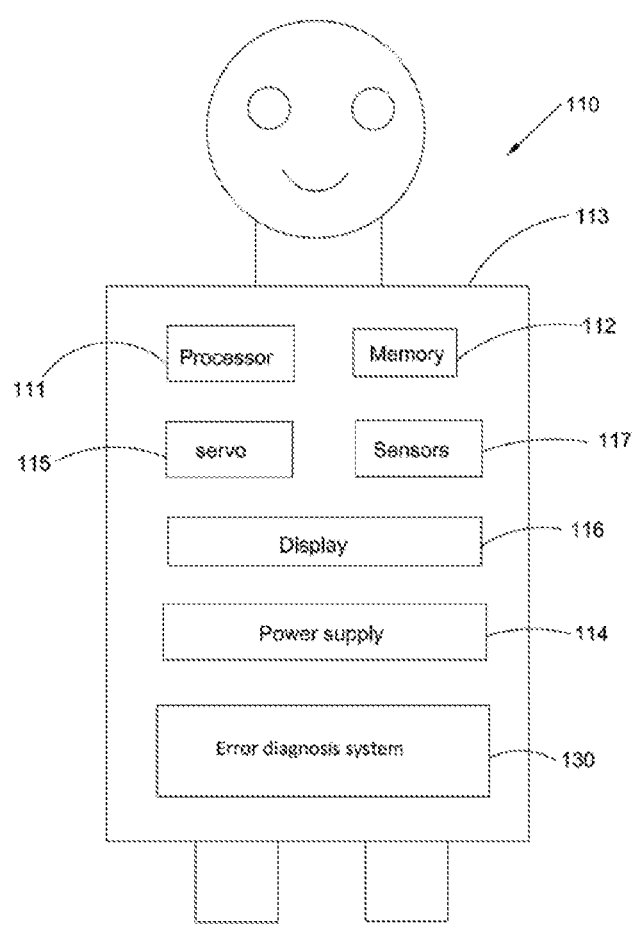
FIG. 1 is a block diagram of a robot diagnosis system including a robot and an error diagnosis system.

FIG. 1 is an environmental block diagram of a robot diagnosis system 100 including a robot 110 and an error diagnosis system 130 for executing a plurality of error diagnosis processes of the robot 110. The robot 110 may electronically communicate with the error diagnosis system 130. The error diagnosis system 130 can be included as part of the robot 110 as an internal component or be an external component to the robot 130 as an external computing device.

The robot 110 includes a chassis 113 that may house a variety of internal and/or external components for various processing, displaying, and movement needs. As an example, the robot 110 may include a processor 111, memory 112, a power supply 114, a servo 115, a display 116, sensors 117, and the error diagnosis system 130.

In one example, the memory 112 may be an internal storage unit of the or an external storage unit, such as a hot-pluggable HDD, a smart media card (SMC), a secure digital (SD) card, and a flash card. The memory is configured to storage computer programs (computerized codes), data, and other applications.

The processor 111 may be a central processing unit (CPU), an universal processor, a digital signal processor (DSP), an application specific integrated circuit (ASIC), a field-programmable gate array (FPGA), a programmable logic device, a discrete gate or transistor logic, or a discrete hardware component. The universal processor may be a microprocessor or a conventional processor. The processor III is configured to execute computerized code.

The servo 115 is a rotary actuator or linear actuator that allows for precise control of angular or linear position, velocity and acceleration. The servo 115 may be used for movement of hands and/or feet and other components of the robot.

The display 116 may be coupled external to the robot 111 or be part of the error diagnosis system 130. The display is configured to display input/output data of the external diagnosis system 130, such as measurement data of the servos 115, for example.

The sensors 117 include various sensors that measure internal and external data of the robot 110, and may include, for example temperature sensors, gravity sensors, acceleration sensors, or infrared sensors.

The power supply 114 is configured to supply power to the robot and related components.

Figure 2:
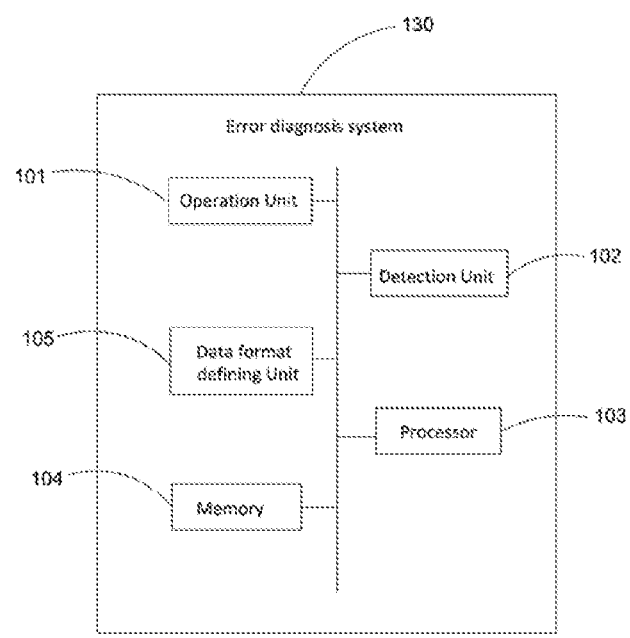
FIG. 2 is a block diagram of one embodiment of the error diagnosis system of the present disclosure.

FIG. 2 is a block diagram of one embodiment of the error diagnosis system 130. In one example, the error diagnosis system 130 includes various components, such as the display 116, an operation unit 101, a detection unit 102, a processor 103, a memory 104, a data format defining unit 105.

The operation unit 101 is configured to conduct detect operational status of the components (e.g., processor 111, memory 112, power supply 114, servo 115, display 116, sensors 117) corresponding to the error diagnosis processes, and operational status of a main control process of the robot 110 or the components.

The detection unit 102 is configured to detect whether the diagnosis data reported by the error diagnosis processes is received at a predetermined frequency.

The processor 103 is configured to analyze the diagnosis data and package the diagnosis data into the diagnosis information, having a predetermined data format, upon receiving the diagnosis data.

The memory 112 is configured to store the diagnosis information as a diagnosis log document.

The data format defining unit 105 is configured to define the data format of the diagnosis information.

In one example, the diagnosis information may include an error status level, a name of the error diagnosis processes, basic diagnosis information, an error code ID number, error data, and reserved data. Specifically, the data format defining unit 105 is configured to define the data formats of the error status level, the name of the error diagnosis processes, the basic diagnosis information, the error code ID number, the error data, and the reserved data.

The error status level is in byte format. The name of the error diagnosis processes and the basic diagnosis information are in bit format. The error code ID number, the error data, and the reserved data are in an integer format.

Specifically, the data format defining unit may be the computer programs within the main controller of the robot. The users may define the data format via a human-computer interacting device of the robot or a human-computer interacting device capable of communicating with the robot. Or, a data format defining code may be directly stored in a storage device of the robot when manufacturing the robot, and the data format defining code may be accessed directly via the main controller.

Figure 3:
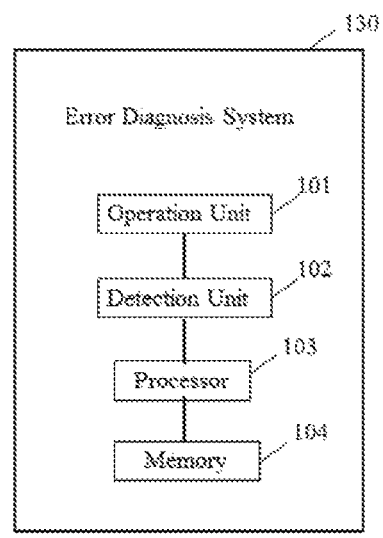
FIG. 3 is a block diagram of another embodiment of the error diagnosis system of the present disclosure.

In another example, as shown in FIG. 3, the error diagnosis system 130 may exclude the data format defining unit 105. That is, the error diagnosis system 130 may only include the operation unit 101, the detection unit 102, the processor 103, and the memory 104.

Figure 4:
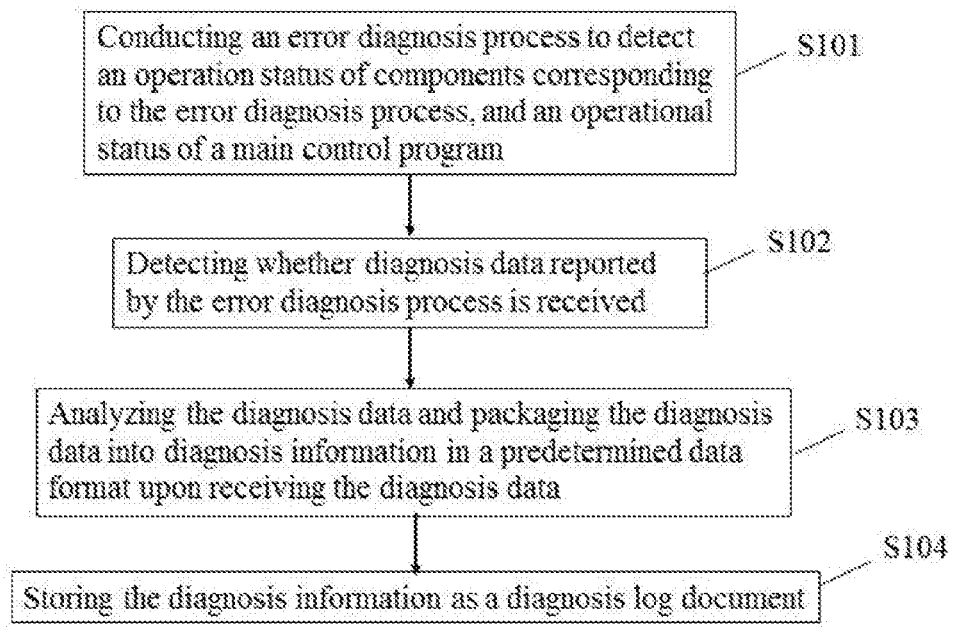
FIG. 4 is a flowchart illustrating an error diagnosis method of a robot in accordance with an embodiment of the present disclosure.

FIG. 4 is a flowchart illustrating an error diagnosis method of a robot in accordance with an embodiment of the present disclosure.

In step S101, conducting the error diagnosis processes to detect the operational status of components corresponding to the error diagnosis processes, and the operational status of the main control process at the predetermined frequency.

In one example, the error diagnosis processes may include a chassis diagnosis application, a servo diagnosis application, a sensor diagnosis application, and a power-supply diagnosis application. The chassis diagnosis application detects an operational status of the chassis and an operational status of a chassis-controlling application, and the chassis-controlling application is configured within the main control process to control the status of the chassis. The servo diagnosis application detects an operational status of the servo and an operation of a servo-controlling application, and the servo-controlling application is configured within the main control process to control the status of the servo. The sensor diagnosis application detects an operational status of the sensor and an operation of a sensor-controlling application, and the sensor-controlling application is configured within the main control process to control the status of the sensor. The power-supply diagnosis application detects an operational status of the power-supply and an operation of a power-supply-controlling application, and the power-supply-controlling application is configured within the main control process to control the status of the power-supply.

In another example, the robot may include components other than the components described in above. Correspondingly, the main control process may include programming blocks configured to control the operational status of each of the components of the robot. The error diagnosis processes may include at least one diagnosis application corresponding to each of the components of the robot and the program blocks.

In one example, the error diagnosis processes may be operated only when the robot is out of work. When the robot is out of work, users may trigger the error diagnosis processes by human-computer interacting methods so as to perform an overall diagnosis for all of the components and the computer programs of the robot. In another example, the error diagnosis processes may be operated when the robot is activated, and may keep on detecting the operational status of the components and the computer programs during an operational process of the robot. In another example, the error diagnosis processes may be triggered by an one key function. The users may conduct the one key function to operate the error diagnosis processes at any moment according to actual requirements. The one key function may be a real button or a virtual key. In another example, the error diagnosis processes may be operated by triggering signals transmitted from other terminal devices capable of communicating with the robot.

In step S102, detecting whether diagnosis data reported by the error diagnosis processes is received.

In one example, the error diagnosis processes may report the diagnosis data upon detecting the errors. The diagnosis data may include error data. In another example, the diagnosis data may also be reported when no error has been detected. The diagnosis data reported during a normal operation of the robot may be analyzed to obtain a pattern of parameter variations, so as to identify potential risks.

In one example, after the step S102, the error diagnosis method may be further configured to store the diagnosis data to a diagnosis data list.

Specifically, the diagnosis data list may further store timestamps corresponding to each of the diagnosis data. The timestamp is configured to indicate a reporting time flag of each of the diagnosis data. The diagnosis data within the diagnosis list may be arranged in accordance with an order of the reporting time flag, or may be arranged in accordance with a category of the component or the category of the main control process.

In step S103, analyzing the diagnosis data and packaging the diagnosis data into diagnosis information in a predetermined data format upon receiving the diagnosis data Specifically, the diagnosis data is usually stored in a format of programming codes or in a binary code, which may not directly indicate the operational status. Therefore, the analysis process may be conducted on the diagnosis data, and the diagnosis data may be packaged into the diagnosis information in the predetermined data format. As such, regular maintenance staffs or the users may directly obtain the operational status.

In one example, the diagnosis data may include an error status level, a name of the error diagnosis processes, basic diagnosis information, an error code identification (ID) number, the error data, and reserved data. Correspondingly, the step S103 may include: analyzing the diagnosis data to obtain the error status level, the name of the error diagnosis processes, the basic diagnosis information, the error code ID number, the error data, and the reserved data.

Specifically, the error status level indicates a degree of the error, and different predetermined error status levels may be set in advance. For example, the errors, such as short-connected of the power-supply, servos stop operating, and error of essential sensors, which may directly cause an impact on the normal operation of the robot, may be set to be at the highest-level. The errors, such as low-voltage of the power-supply, speed of the servo decrease, or the error of the non-essential sensors, which may not directly cause an impact on the normal operation of the robot, may be set to be at the medium-level. The errors, such as looseness of the chassis and damages of indicators of the power-supply, which may not cause an impact on the normal operation of the robot in a short period, may be set to be at the lowest-level. If no error occurs, the programming block of the error status level may be set to be empty or assigned a value of zero. Correspondingly, an error status level of the main control process may also be classified according to the degree of the error. For example, the higher error status level may indicate the worse degree of the error.

Specifically, the basic diagnosis information indicates basic error condition information of a certain error status. For example, the corresponding basic diagnosis information may be "short-connected of the power-supply" when the power-supply has a short-connected error. The error code ID is an unique identifier, and is configured to distinguish between one and the other error codes. The reserved data is configured to be backup data. The reserved data is configured to describe the error codes when there is a requirement, and may be assigned to be an initial value, such as zero, when there is no requirement.

In one example, after the step S102, the error diagnosis method may further include: returning to step S101 if the diagnosis data reported by the error diagnosis processes is not received.

In step S104, storing the diagnosis information as the diagnosis log document.

Specifically, the diagnosis log document may be directly provided to the maintenance staffs and the users. The diagnosis log document may store the diagnosis information in accordance with a time order, a classification of the components corresponding to the diagnosis information, or a classification of the diagnosis information classified by the main control process.

In one example, if the robot includes a display device, the error diagnosis method may further include displaying the diagnosis information in the predetermined data format on the display device. If the robot does not include the display device, the diagnosis information may be displayed via an external display device capable of communicating with the robot. Alternatively, the user may copy the diagnosis log document and display the diagnosis log document on other display devices.

In one example, a plurality of error-indicators are configured on the robot (e.g., LEDs), and are configured to indicate different error statuses by different colors according to the diagnosis data.

In view of the above, the error diagnosis processes may be conducted to obtain the operational status of the components corresponding to the error diagnosis processes, and the operational status of the main control process. As such, the error of the components and the error of the computer programs may be detected. The diagnosis data may be analyzed, packaged into the diagnosis information in the predetermined format, and stored as the diagnosis log document, when receiving the diagnosis data. Such that, the maintenance staffs may directly check the diagnosis log document to find out the error, and an error detection process of the robot may be greatly simplified.

Figure 5:
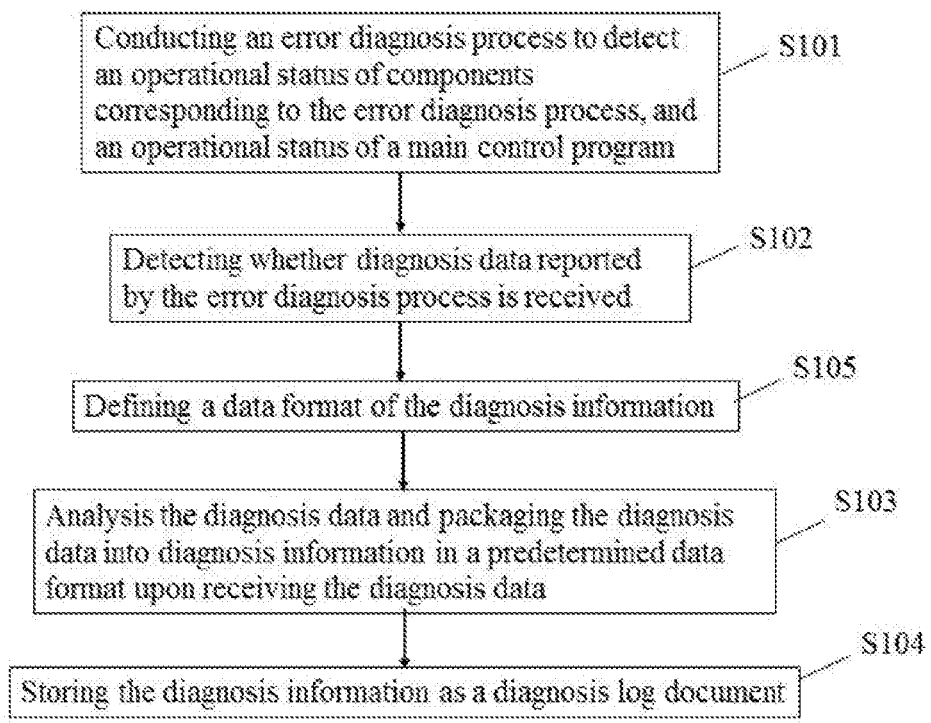
FIG. 5 is a flowchart illustrating an error diagnosis method of a robot in accordance with another embodiment of the present disclosure.

In another example, as shown in FIG. 5, before the step S103, the error diagnosis method may further include the following step.

In step S105, defining a data format of the diagnosis information.

In one example, the diagnosis information may include the error status level, the name of the error diagnosis processes, the basic diagnosis information, the error code ID number, the error data, and the reserved data. Specifically, the step S105 may include defining the data formats of the error status level, the name of the error diagnosis processes, the basic diagnosis information, the error code ID number, the error data, and the respective reserved data.

In another example, the error diagnosis system of the robot may further include a returning unit configured to return the process to step S101, if the diagnosis data reported by the error diagnosis processes is not received.

The error status level may be in a byte format. The name of the error diagnosis processes and the basic diagnosis information may be in a bit format. The error code ID number, the error data, and the reserved data may be in an integral format.

In one example, the data format of the diagnosis information may be defined as follow.

```
Diagnosis information msg:cruiser_diagnosiss.msg
    {
    byte level; //indicating the error status level
    string name; //indicating the name of the error diagnosis processes
    string message; //indicating the basic diagnosis information
    int32 key; //indicating the error code ID number
    int32 value; //indicating the error data
    int32 data; //indicating the reserved data
    }
```

For example, with respect to the error of the short-connected of the power-supply, the diagnosis information may be as below.
byte=1;
name="power-supply diagnosis";
message="short-connected of the power-supply";
key=0;
value=0;
data=0.

In another example, the diagnosis information may be defined in other data formats.

In view of the above, the error diagnosis processes may be conducted to obtain the operational status of the component corresponding to the error diagnosis processes, and the operational status of the main control process. As such, the error of the components and the error of the computer programs may be detected. The diagnosis data may be analyzed, packaged into the diagnosis information in the predetermined format, and stored as the diagnosis log document, when receiving the diagnosis data. Such that, the maintenance staffs may directly check the diagnosis log document to find out the error, and an error detection process of the robot may be greatly simplified.

Figure 6:
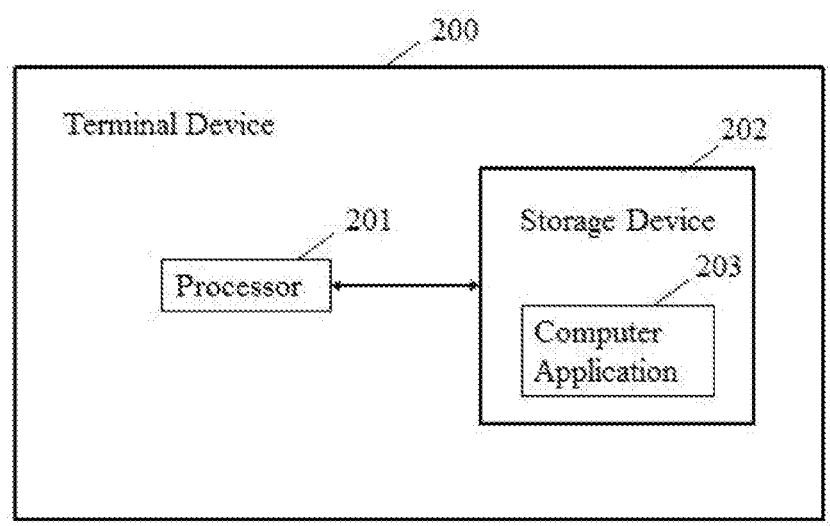
FIG. 6 a schematic view of a terminal device in accordance with one embodiment of the present disclosure.

As shown in FIG. 6, the present disclosure relates to a terminal device 200, including: the processor 201, the storage device 202, and a computer application 203 stored in the storage device 202, wherein the computer application 203 may be operated by the processor 201. The processor 201 may operate the computer application 203 to perform the method for diagnosing the robot errors described in above. For example, the step 3101 to the step 3104 shown in FIG. 4. Or the processor 201 may operate the computer application 203 to perform each of the functions of the system for diagnosing the robot errors.

In one example, the computer application 203 may include at least one unit stored in the storage device 202, and the at least one unit may be operated by the processor 201 to accomplish the present disclosure. The at least one unit may include computer programming instruction codes capable of achieving certain functions. The computer programming instruction codes are configured to describe the operational process of the computer application 203 within the terminal device 200. For example, the operation application 203 may include the operation unit, the detection unit, the processor, and the memory.

The operation unit is configured to conduct the error diagnosis processes to detect the operational status of the components corresponding to the error diagnosis processes, and the operational status of the main control process.

The detection unit is configured to detect whether the diagnosis data reported by the error diagnosis processes is received.

The processor is configured to analyze the diagnosis data and package the diagnosis data into the diagnosis information in the predetermined data format upon receiving the diagnosis data.

The memory is configured to store the diagnosis information as the diagnosis log document.

The terminal device 200 may be computer devices, such as desktops, laptops, personal digital assistants (PDAs), and cloud servers. The terminal devices may include, but not limited to, the processor 201 and the storage device 202. The person skilled in the art may understand that the terminal device 200 shown in FIG. 6 is merely an example, and may not limit the terminal device 200. The terminal device 200 may include the components other than the components shown in FIG. 6. In another example, the terminal device may include combinations of some of the components shown in FIG. 6. Or the components which are not shown in FIG. 6. For example, the terminal device may include an input-output (I/O) device, a network accessing device, and a bus.

In one example, the storage device 202 may be an internal storage unit of the terminal device 200. The storage device 202 is further configured to temporarily store the data which has been outputted or the data just about to output.

The person skilled in the art may clearly understand that for the convenience and simplicity of the description, the function units and the units described in above are merely examples. Practically, the functions may be accomplished by different function units or units. That is, the internal structure of the device may include different function units or units to accomplish the total or partial functions described in above. Each of the functional units in the various embodiments of the present invention may be integrated into one processing unit. Each of the units may be physically present, or two or more units may be integrated into one unit. The above-mentioned integrated unit can be implemented either in the form of hardware or in the form of computer programs functional units. In addition, the name of each of the function units and the units is merely for the convenience of distinguishing one and the other, and may not limit the claim scope of the present disclosure. The operational process of the units within the system may refer to the process of the embodiment of the method, and may not be described again.

In the above embodiment, the description of each of the embodiments has its own focus. For the parts which are not described or are not described in detail in one embodiment may be reference to the related description in other embodiments.

The person skilled in the art may notice that the steps and the units described in the present disclosure may be achieved by the electronic components or the combination of the computer programs and the electronic components. The detailed specification may determine whether the functions are achieved by the electronic components or the computer programs. The person skilled in the art may adopt different ways, which does not beyond the scope of the present disclosure, to achieve each of the specific applications.

In addition, each of the functional units in the various embodiments of the present invention may be integrated into one processing unit. Each of the units may be physically present, or two or more units may be integrated into one unit.

The above-mentioned integrated unit can be implemented either in the form of hardware or in the form of software functional units.

The integrated units in the above-described other embodiments may be stored in a computer-readable storage medium when being implemented in the form of software functional units and are sold or used as stand-alone products. Based on this understanding, the technical solution of the present disclosure, either essentially or in part, contributes to the prior art, or all or part of the technical solution may be embodied in the form of a software product stored in a storage medium. In an example, the computer-readable storage medium includes a number of instructions for enabling a computer device (which may be a personal computer, a server, a network device, etc.) or a processor to perform all or part of the steps of the methods described in the various embodiments of the present disclosure. The aforementioned storage medium includes a variety of media such as a USB disk, a mobile hard disk, a read-only memory (ROM), a random access memory (RAM), a magnetic disk, an optical disk, carrier signals, electronic signals, the software distribution medium, and so on. It is noted that the content of the computer-readable storage medium may be increased or decreased according to the jurisdictions and the practice. For example, the computer-readable storage medium may not include the carrier signals and the transmission signals in some jurisdictions.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A computer-implemented method of diagnosing robot errors, comprising:
   providing a robot comprising components including a memory and a processor;
   detecting operational status of the components and an operational status of a main control process of the robot at a predetermined frequency by conducting error diagnosis processes;
   generating diagnosis data comprising an error status level, a name of an error diagnosis processes, an error code identity (ID) number of the components, basic diagnosis information, error data, and reserved data;
   defining the error status level, the name of the error diagnosis processes, the error code identity (ID) number of the components, the basic diagnosis information, the error data, and the reserved data, wherein the error status level is in a byte format, the name of the error diagnosis processes and the basic diagnosis information are in a bit format, and the error code ID number, the error data, and the reserved data are in an integral format;
   packaging the diagnosis data into diagnosis information in a predetermined data format; and
   storing the diagnosis information in the memory.

2. The method according to claim 1, wherein the error diagnosis method further comprises:
   displaying, the diagnosis information in the predetermined data format on a display.

3. The method according to claim 1, wherein the error diagnosis processes comprise a chassis diagnosis application, a servo diagnosis application, a sensor diagnosis application, or a power-supply diagnosis application.

4. A terminal device for diagnosing robot errors, comprising;
one or more processors; and
a memory; and
one or more programs;
wherein the one or more programs are stored in the memory and configured to be executed by the one or more processors, to cause the one or more processors to:
conduct error diagnosis processes to detect an operational status of components corresponding to the error diagnosis processes, and an operational status of a main control process at a predetermined frequency;
generate diagnosis data comprising a data format having an error status level, a name of the error diagnosis processes, an error code ID number of the components, basic diagnosis information, error data, and reserved data;
detect whether diagnosis data reported by the error diagnosis processes is received;
define the error status level, the name of the error diagnosis processes, the error code ID number of the components, the basic diagnosis information, the error data, and the reserved data, in response to the diagnosis data being received, wherein the error status level is in a byte format, the name of the error diagnosis processes and the basic diagnosis information are in a bit format, and the error code ID number, the error data, and the reserved data are in an integral format;
package the diagnosis data into diagnosis information in a predetermined data format; and
store the diagnosis information as a diagnosis log document in the memory.

5. The terminal device according to claim 4, wherein the one or more programs are further executed by the one or more processors, to cause the one or more processors to:
display the diagnosis information in the predetermined data format on a display.

6. The terminal device according to claim 4, wherein the error diagnosis processes comprise a chassis diagnosis application, a servo diagnosis application, a sensor diagnosis application, or a power-supply diagnosis application.

* * * * *